United States Patent [19]

Lee

[11] Patent Number: 5,784,354
[45] Date of Patent: Jul. 21, 1998

[54] OPTICAL PICKUP DEVICE

[75] Inventor: Keun-Jong Lee, Seoul, Rep. of Korea

[73] Assignee: Daewoo Electronics Co., Ltd., Seoul, Rep. of Korea

[21] Appl. No.: 867,427

[22] Filed: Jun. 6, 1997

[30] Foreign Application Priority Data

Dec. 30, 1996 [KR] Rep. of Korea ............. 96-77259

[51] Int. Cl.[6] ............................................. G11B 7/00
[52] U.S. Cl. ............. 369/112; 369/44.14; 369/44.37; 369/110; 369/94
[58] Field of Search ............... 369/112, 44.14, 369/44.37, 110, 44.23, 94

[56] References Cited

U.S. PATENT DOCUMENTS

| | | | |
|---|---|---|---|
| 5,444,684 | 8/1995 | Yanagi et al. | 369/44.28 |
| 5,673,247 | 9/1997 | Sekimoto et al. | 369/112 |
| 5,687,154 | 11/1997 | Tsuchiya et al. | 369/112 |

FOREIGN PATENT DOCUMENTS

0470807  2/1992  United Kingdom.

*Primary Examiner*—Tod R. Swann
*Assistant Examiner*—Kim-Kwok Chu
*Attorney, Agent, or Firm*—Beveridge, DeGrandi, Weilacher & Young, LLP

[57] ABSTRACT

To focus a beam irradiated from a laser light source on optical discs with different densities, objective lens part has first and second objective lenses integrally disposed from side to side of each other and parallel with the optical disc. A beam splitter part having first and second beam splitter is respectively arranged under the first and second objective lenses. The beam splitter part has first and second coating faces for respectively reflecting upwardly toward the first and second objective lens. A third beam splitter is formed integrally with and at a side of the second beam splitter to integrally operate with the beam splitter part. The third beam splitter has a third coating face. A wire type-actuator integrally moves freely in any direction the objective lens part, the beam splitter part, and the third beam splitter by means of wires in order to record information and control focusing and tracking. A photodetector is installed below the beam splitter part to receive the beam transmitted through the first or second beam splitter via the first or second objective lens after being reflected by the optical disc.

20 Claims, 6 Drawing Sheets

OPTICAL PICKUP DEVICE

BACKGROUND OF THE INVENTION

1. Field of the Invention

The present invention relates to an optical pickup device, and more particularly to an optical pickup device capable of reproducing discs of two types having different densities by double beam focuses of different sizes.

2. Description of the Prior Art

Information reproducing/recording systems for using optical discs such as laser discs or compact discs have been developed in recent years. Such optical discs have a variety of information, e.g., generally, a digital audio disc is associated with the reproducing of musical sounds, and a digital video disc is associated with the reproducing of images. These discs are recorded with information at a proper recording density in accordance with the purpose of usage. For example, the digital audio disc for reproducing musical sounds is recorded with smaller density, and the digital video disc for reproducing images is with larger density, e.g., as many as four times. The information stored within the inside of the above-mentioned discs is readable/writable by means of optical pickup devices, and can reproduce the discs of different kinds having different densities by means of optical pickup devices of different kinds.

A construction and operation of a general optical pickup device is disclosed in U.S. Pat. No. 4,767,921 or 4,868,377.

The conventionally general optical pickup device will be described in detail with reference to FIG. 1 below.

Figure 1:
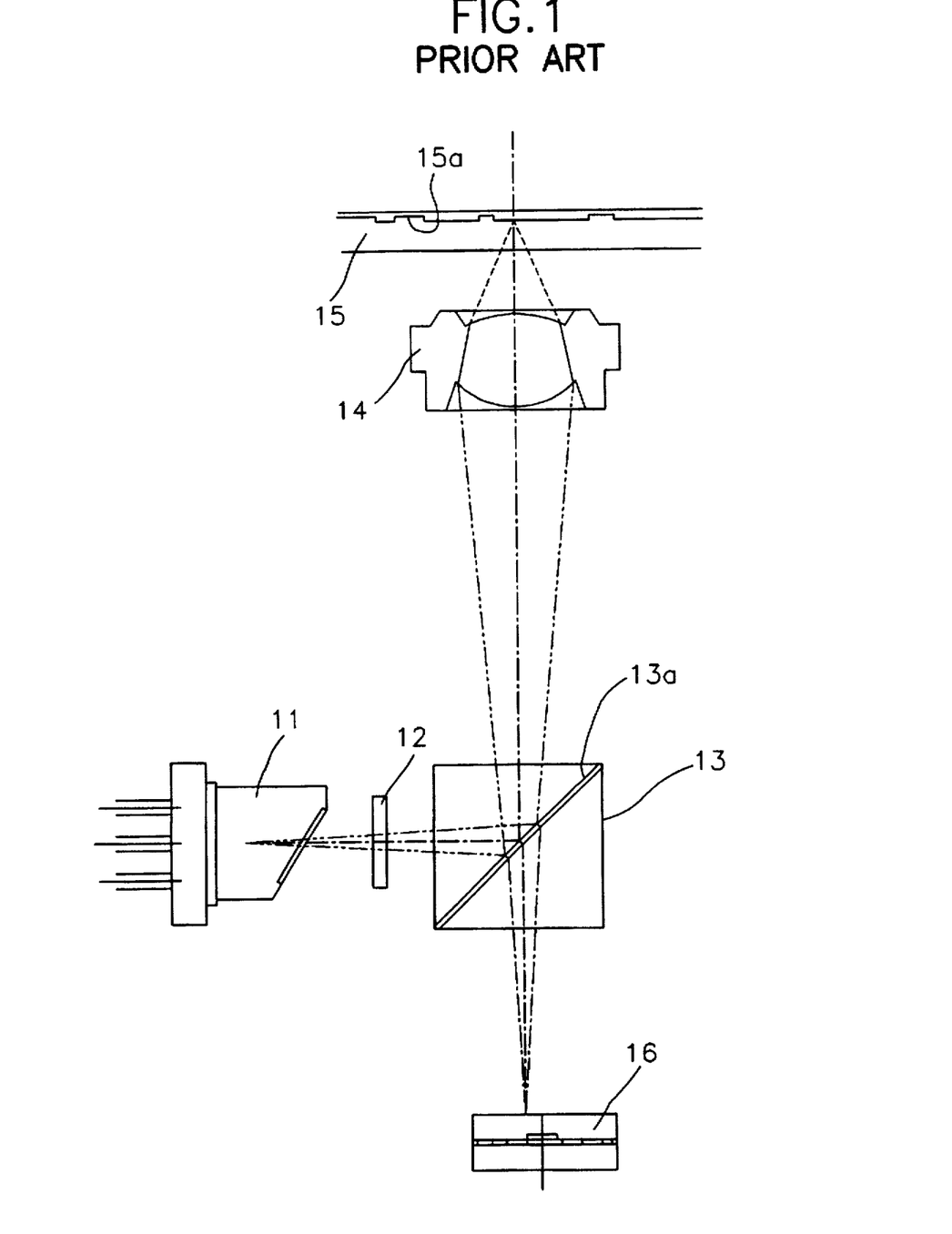
FIG. 1 is a schematic view showing a conventional optical pickup device.

FIG. 1 is a schematic view showing the conventionally general optical pickup device. In FIG. 1, a reference numeral 11 denotes a light source for generating a laser beam, which is a laser diode 11. The laser beam emitted from laser diode 11 is diffracted while transmitting through a diffraction grating 12. The diffracted beam proceeds toward a beam splitter 13.

Here, beam splitter 13 is provided in such a manner that two right-angled prisms are installed to oppose each other against respective inclination planes of 45°, and a coating layer 13a is formed along the contacting portion of the prisms, thereby transmitting part of the incident beam and reflecting the other incident beam to be perpendicular to the incident beam while securing the property of travelling straight from the incident beam.

The diffracted beam is reflected toward optical disc 15 by means of beam splitter 13. The beam reflected from beam splitter 13 focuses onto a recording plane 15a of an optical disc 15 while passing through an objective lens 14 installed in front of a recording medium such as optical disc 15. A positional accuracy, i.e., focusing error and tracking error, of the pickup device with respect to optical disc 15 is detected from an image of the beam received into a photodetector 16, and therefore, the focusing and tracking are controllable. Also, the information is read out on the basis of the amount of the reflected light determined by pits in recording plane 15a of optical disc 15.

Furthermore, if the recording capacity of the disc is four times like the digital video disc over the digital audio disc, the width of pits in the disc is consequently decreased by ½. For this reason, the size of a focused spot onto the digital video disc should be half of that onto the digital audio disc with the consequence of necessarily employing different optical pickup devices in reproducing the digital video disc and digital audio disc by means of the conventional optical pickup devices. That is, in order to accurately read out data

2 respectively recorded on the digital audio disc and digital video disc, it is required to separately apply an optical pickup device for digital audio disc of which a beam spot size is approximately 1.6 μm when focusing onto the digital audio disc and an optical pickup device for digital video disc of which a beam spot size is approximately 0.8 μm when focusing onto the digital video disc.

SUMMARY OF THE INVENTION

Therefore, it is an object of the present invention to provide an optical pickup device capable of reproducing discs of two kinds having different densities by a simple construction that an objective lens part and a beam splitter part are integrally actuated.

It is another object of the present invention to provide an optical pickup device capable of recording and reproducing discs of two kinds having different densities by a simple construction that an objective lens part and a beam splitter part are integrally actuated.

To achieve the object of the present invention, an optical pickup device for reproducing optical discs of two kinds having different densities includes a laser light source for irradiating a laser beam, and an objective lens part for focusing the laser beam on optical discs of two kinds having different densities. The objective lens part is positioned on an optical path of the laser beam irradiated from the laser light source and has first and second objective lenses integrally disposed from side to side of each other and parallel with the optical disc.

The optical pickup device comprises a beam splitter part having first and second beam splitters respectively arranged under the first and second objective lenses and the beam splitter part being integrally actuated with the objective lens part. The beam splitter part has first and second coating faces for respectively reflecting upwardly toward the first and second objective lenses, and the first and second coating faces are parallel with each other. The first and second coating faces are partially reflecting and partially transmitting faces so that one part of the incident beam onto the second coating face is reflected toward the second objective lens and the other part is transmitted toward the first coating face.

The optical pickup device comprises a third beam splitter formed integrally with the second beam splitter to integrally operate with the beam splitter part, the third beam splitter having a third coating face to reflect the beam from the laser light source toward the second coating face of the second beam splitter.

The optical pickup device comprises a wire type-actuator for freely integrally moving in any direction the objective lens part, the beam splitter part, and the third beam splitter by means of a wire in order to record information and control focusing and tracking.

The optical pickup device comprises a photodetector for receiving a beam transmitted through the first or second beam splitter via the first or second objective lens after the beam is reflected by the optical disc, the photodetector being installed at a predetermined position below the beam splitter part.

The first, second, and third beam splitters are cubic-shaped prisms of the same size. The first, second, and third coating faces are respectively formed at diagonal faces of the beam splitters, the diagonal face making an angle of 45° with an optical axis of the objective lens.

The laser light source and photodetector are arranged side by side with a same interval as the intervals between the beam splitters, so that the optical disc with a predetermined density, the objective lens corresponding to the optical disc, the beam splitter connected under the objective lens, and the photodetector can be arranged on a straight line.

The third coating face of third beam splitter comprises a totally reflecting face to minimize loss of the beam.

Furthermore, to achieve the object of the present invention, an optical pickup device for reproducing optical discs of two kinds having different densities includes a laser light source for irradiating laser beams with a predetermined ratio of a first polarization to a second polarization, and an objective lens part for focusing the laser beam on optical discs of two kinds having different densities. The objective lens part is positioned on an optical path of the laser beams irradiated from the laser light source and has first and second objective lenses integrally disposed from side to side of each other and parallel with the optical disc.

The optical pickup device comprises a beam splitter part having first and second beam splitters respectively arranged under the first and second objective lenses and the beam splitter part being integrally actuated with the objective lens part. The beam splitter part has first and second polarizing faces for reflecting an incident beam toward the first and second objective lens or for transmitting the beams therethrough, the first and second polarizing faces are parallel with each other. Between the first and the second beam splitters a polarization-converting face is installed for converting a polarization state of the beam transmitted therethrough. Thus, among the beams which are incident on the second polarizing face, a beam of first polarization is reflected toward the second objective lens, and the beam of second polarization is transmitted through the second polarizing face and then the polarization state of the beam is converted into first polarization by the polarization-converting face, and the converted beam of first polarization is reflected by the first polarizing face toward the first objective lens.

The optical pickup device comprises a polarization-converting plate installed between the objective lens part and the beam splitter part, so that while the beam of first polarization reflected by the first or the second polarizing face of the beam splitter part is returned to the beam splitter part via the optical disc, a polarization of the beam is converted into the second polarization.

The optical pickup device comprises a third beam splitter formed integrally with the second beam splitter to integrally operate with the beam splitter part, the third beam splitter having a third coating face to reflect the beam from the laser light source toward the second polarizing face of the second beam splitter.

The optical pickup device comprises a wire type-actuator for integrally moving freely in any direction of the objective lens part, the beam splitter part, and the third beam splitter by means of a wire in order to record information and control focusing and tracking.

The optical pickup device comprises a photodetector for receiving a beam transmitted through the first or second beam splitter via the first or second objective lens after the beam is reflected by the optical disc, the photodetector being installed at a predetermined position below the beam splitter part.

The polarization-converting face installed between the first beam splitter and the second beam splitter comprises λ/2 plate.

The polarization-converting plate installed between the objective lens part and the beam splitter part comprises λ/4 plate.

To achieve another object of the present invention, an optical pickup device for recording or reproducing optical discs of two kinds having different densities includes first and second laser light sources for irradiating laser beams with different wavelengths, and an objective lens part for focusing the laser beam on two kinds of optical discs having different densities. The objective lens part is positioned on an optical path of the laser beam irradiated from the laser light source and has first and second objective lenses integrally disposed from side to side of each other and parallel with the optical disc.

The optical pickup device comprises a beam splitter part having first and second beam splitters respectively arranged under the first and second objective lenses and the beam splitter part being integrally actuated with the objective lens part. The beam splitter part has first and second coating faces for respectively reflecting upwardly toward the first and second objective lenses, and the first and second coating faces are parallel with each other. The first and second coating faces are partially reflecting and partially transmitting faces so that one part of the incident beam onto the second coating face is reflected toward the second objective lens and the other part is transmitted toward the first coating face.

The optical pickup device comprises a reflecting part having third and fourth beam splitters formed integrally with the second beam splitter to integrally operate with the beam splitter part, the third and the fourth beam splitters having third and fourth coating faces to respectively reflect the beam from the laser light source toward the second coating face of the second beam splitter, and the third and the fourth coating faces are parallel with each other. The third and the fourth coating faces are partially reflecting and partially transmitting faces so that the beam irradiated from the first laser light source is reflected by the third coating face toward the second coating face of the second beam splitter, and the beam irradiated from the second laser light source is reflected by the fourth coating face to be partially transmitted through the third coating face and then proceed toward the second coating face of the second beam splitter.

The optical pickup device comprises a wire type-actuator for integrally moving freely in any direction the objective lens part, the beam splitter part, and the reflecting part by means of wires in order to record information and control focusing and tracking.

The optical pickup device comprises a photodetector for receiving a beam transmitted through the first or second beam splitter via the first or second objective lens after the beam is reflected by the optical disc, the photodetector being installed at a predetermined position below the beam splitter part.

Furthermore, to achieve another object of the present invention, an optical pickup device for recording and reproducing optical discs of two kinds having different densities includes first and second laser light sources for irradiating laser beams with different wavelengths, the laser light source for irradiating laser beams with a predetermined ratio of a first polarization to a second polarization, and an objective lens part for focusing the laser beam on optical discs of two kinds having different densities. The objective lens part is positioned on an optical path of the laser beams irradiated from the laser light source and has first and second objective lenses integrally disposed from side to side of each other and parallel with the optical disc.

The optical pickup device comprises a beam splitter part having first and second beam splitters respectively arranged under the first and second objective lenses and the beam splitter part being integrally actuated with the objective lens part. The beam splitter part has first and second polarizing faces for reflecting an incident beam toward the first and second objective lenses or for transmitting the beams therethrough, the first and second polarizing faces are parallel with each other. Between the first and the second beam splitters a polarization-converting face is installed for converting a polarization state of the beam transmitted therethrough. Thus, among the beams which are incident on the second polarizing face, a beam of first polarization is reflected toward the second objective lens, and the beam of second polarization is transmitted through the second polarizing face and then the polarization state of the beam is converted into first polarization by the polarization-converting face, and the converted beam of first polarization is reflected by the first polarizing face toward the first objective lens.

The optical pickup device comprises a polarization-converting plate installed between the objective lens part and the beam splitter part, so that while the beam of first polarization reflected by the first or the second polarizing face of the beam splitter part is returned to the beam splitter part via the optical disc, a polarization of the beam is converted into the second polarization.

The optical pickup device comprises a reflecting part having third and fourth beam splitters formed integrally with the second beam splitter to integrally operate with the beam splitter part, the third and the fourth beam splitters having third and fourth coating faces to respectively reflect the beam from the laser light source toward the second polarizing face of the second beam splitter, and the third and the fourth coating faces are parallel with each other. The third and the fourth coating faces are partially reflecting and partially transmitting faces so that the beam irradiated from the first laser light source is reflected by the third coating face toward the second polarizing face of the second beam splitter, and the beam irradiated from the second laser light source is reflected by the fourth coating face to be partially transmitted through the third coating face and then proceed toward the second polarizing face of the second beam splitter.

The optical pickup device comprises a wire type-actuator for integrally moving freely in any direction the objective lens part, the beam splitter part, and the third beam splitter by means of a wire in order to record information and control focusing and tracking.

The optical pickup device comprises a photodetector for receiving a beam transmitted through the first or second beam splitter via the first or second objective lens after the beam is reflected by the optical disc, the photodetector being installed at a predetermined position below the beam splitter part.

According to the optical pickup device of the present invention as described above, the objective lens part having two objective lenses for reproducing discs of two kinds with different densities is used, thereby making it possible to reproduce discs of two types with different densities by means of the single optical pickup device. Also, an objective lens part and a beam splitter part are integrally formed and actuated, so that the number of required constituent elements can be decreased and the operational mechanism of the objective lens part and the beam splitter part is simplified, and therefore, the error generation rate is sharply decreased when reproducing information of the optical disc.

Furthermore, by means of such a very simple construction that a fourth beam splitter is connected to the beam splitter part and a second laser light source for irradiating a laser beam of another wavelength toward the fourth beam splitter is installed, the recording of information on CDR (Compact Disc Recordable) and reproducing of information of the CDR, which normally requires the laser beam of another wavelength becomes possible.

According to the optical pickup device of the present invention, for the Compact Disc and Digital Video Disc of which the recording capacities are different, reproducing both discs of the two types is possible. Moreover, in case of CDR which requires the laser beam of another wavelength, recording and reproducing the disc by only adding the simple constituent elements in manufacturing the optical pickup device is also possible.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

An optical pickup device according to the present invention will be described in detail with reference to accompanying drawings.

Embodiment 1

Figure 2:
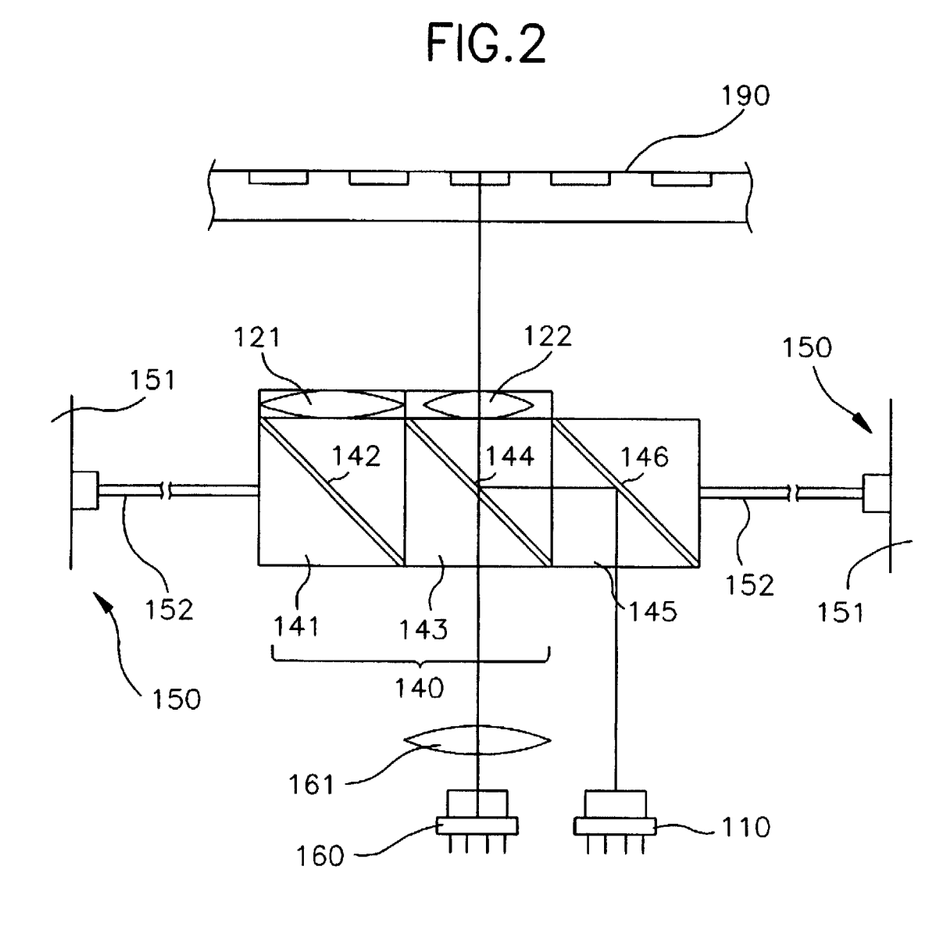
FIG. 2 is a schematic view showing an optical pickup device in which a beam path is shown when reproducing information of an optical disc using a second objective lens according to a first embodiment of the present invention.
Figure 3:
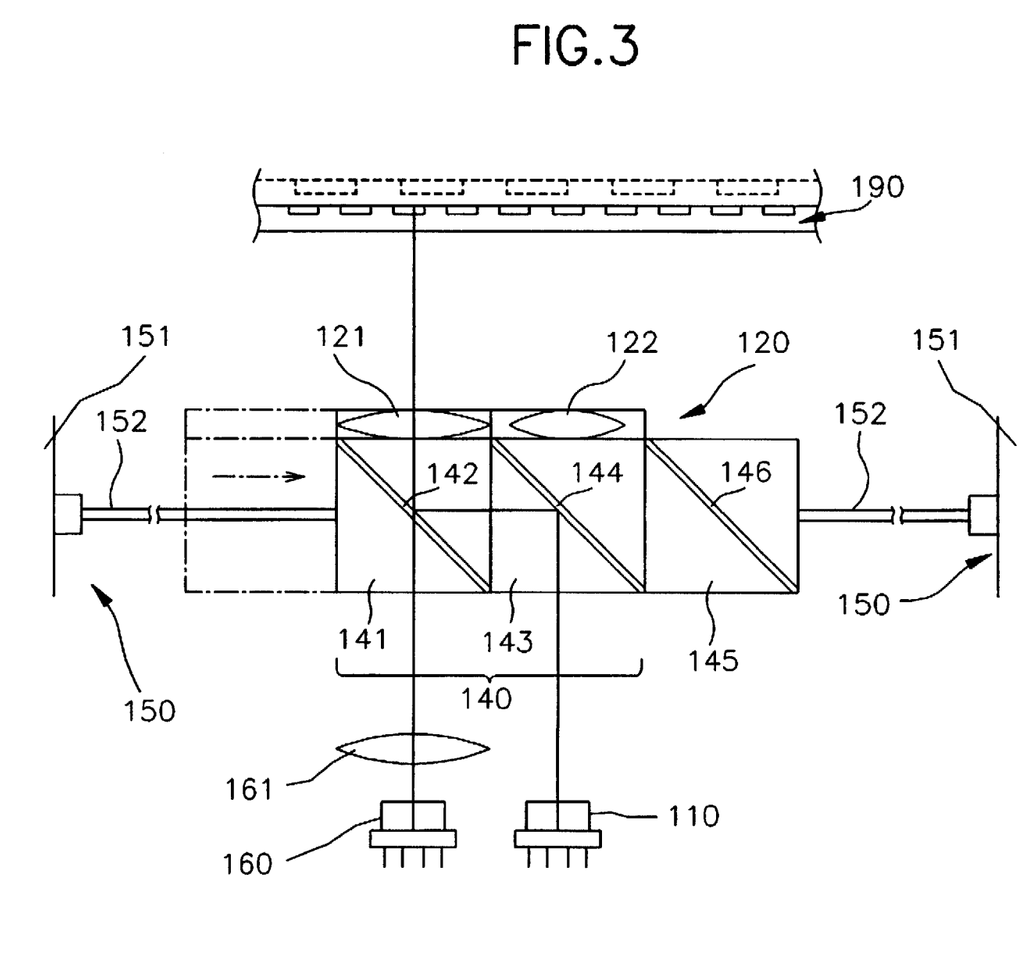
FIG. 3 is a schematic view showing the optical pickup device in which a beam path is shown when reproducing information of an optical disc using a first objective lens according to the first embodiment of the present invention.

FIG. 2 is a schematic view showing an optical pickup device in which a beam path is shown when reproducing information of an optical disc using a second objective lens according to a first embodiment of the present invention, and FIG. 3 is a schematic view showing the optical pickup device in which a beam path is shown when reproducing information of an optical disc using a first objective lens according to the first embodiment of the present invention.

In this embodiment, as shown in FIG. 2 and FIG. 3, a laser diode 110 with wavelength 650 nm is installed as a light source that generates a laser beam, which can reproduce both CD(Compact Disc) and DVD(Disital Video Disc) with different densities from each other.

An objective lens part 120 is positioned over the laser diode 110. Objective lens part 120 has first and second objective lenses 121, 122 integrally disposed from side to side of each other and parallel with optical disc 110. As first and second objective lenses 121, 122, an objective lens for DVD in which N.A. is 0.6 and an objective lens for CD in which N.A. is 0.4 are used to focus the beam irradiated from laser diode 110 on DVD and CD with different densities.

A beam splitter part 140 is integrally installed under objective lens part 120. Beam splitter part 140 is composed of first and second beam splitters 141, 143 respectively arranged under first and second objective lenses 121, 122. The first and second beam splitters are cubic-shaped prisms of the same size. First and second coating faces 142, 144 of first and second beam splitters 141, 143 are respectively formed at diagonal faces of the beam splitters, the diagonal faces making an angle of 45° with optical axes of objective lens 121, 122. First and second coating faces 142, 144 are parallel with each other. First and second coating faces 142, 144 are partially reflecting and partially transmitting faces. Thus, the incident beam on beam splitter part 140 is partially reflected toward first and second objective lenses 121, 122.

A third beam splitter 145 is formed integrally with and at a side of second beam splitter 143. Third beam splitter 145 is a cubic-shaped prism with the same size as first and second beam splitters 141, 143. A third coating face 146 of third beam splitter 145 is formed at a diagonal face of third beam splitter 145, the diagonal face making an angle of 45° with optical axes of objective lenses 121, 122. Third coating face 146 is parallel with first and second coating faces 142, 144. Third coating face 146 of third beam splitter 145 is preferably a totally reflecting face to minimize loss of the beam. Third coating face 146 can be a partially reflecting face.

A wire type-actuator is composed of wires 152 and an actuating part 151. Objective lens part 120, beam splitter part 140, and third beam splitter 145 are integrally formed, and both sides of the integral body are contacted with actuating part 151 by wires 152. Thereby, they are actuated to be integrally moved in any direction for reproducing information and control focusing and tracking.

A photodetector 160 is installed at a predetermined position below the beam splitter part. Photodetector 160 is installed in order to receive the beam transmitted through first beam splitter 141 via first objective lens 121 or the beam transmitted through second beam splitter 143 via second objective lens 122 after being reflected by optical disc 190.

Laser diode 110 and photodetector 160 are arranged side by side with the same interval as the intervals between the beam splitters 141, 143, 145, so that the optical disc with a predetermined density, the objective lens corresponding to the optical disc, the beam splitter connected under the objective lens, and the photodetector can be arranged on a straight line.

Hereinafter, an operation according to the foregoing embodiment will be described.

The laser beam is irradiated from laser diode 110 toward third beam splitter 145.

The beam is incident on third coating face 146 of beam splitter 160 with an angle of 45°. The laser beam is reflected by third coating face 146 to be bent at a right angle with respect to the incident beam. Then, the beam is incident on second coating face 144 of beam splitter 143 with an angle of 45°. One part of the beam is reflected by second coating face 144 to be bent at a rightangle with respect to the incident beam and then proceeds to second objective lens 122 (objective lens for CD), and the other part of the beam is transmitted through second coating face 144 to be incident on first coating face 142.

When the optical disc to be reproduced is CD, the beam transmitted through first objective lens for DVD 121 falls because the beam does not accurately focus on CD, only the beam transmitted through second objective lens for CD 122 can focus accurately on CD.

Both sides of objective lens part 120, beam splitter part 140, and third beam splitter 145 formed integrally are contacted with actuating part 151 by wires 152. They are actuated to be integrally moved in any direction, so that a recording pit, second objective lens for CD 122, second beam splitter, and photodetector 160 can be arranged on a straight line to reproduce information and control focusing and tracking.

Thus, the beam focused on CD after being transmitted through second objective lens for CD 122 is reflected to be incident on second beam splitter 143 via second objective lens 122 for CD.

The incident beam is partially transmitted through second coating face 144 of second beam splitter 143, and then the beam is condensed by a condensing lens 161 to be received on photodetector 160, and thereby reproducing information on CD and controlling of focusing and tracking.

When the optical disc to be reproduced is DVD, the beam transmitted through second objective lens for CD 122 falls because the beam does not accurately focus on DVD, only the beam transmitted through first objective lens for DVD 121 can focus accurately on DVD.

Objective lens part 120, beam splitter part 140, and third beam splitter 145 are formed integrally actuated to be integrally moved in any direction, so that a recording pit, first objective lens for DVD 121, first beam splitter 141, and photodetector 160 can be arranged on a straight line to reproduce information of DVD and control focusing and tracking.

Thus, the beam focused on DVD after being transmitted through first objective lens for DVD 121 is reflected to be incident on first beam splitter 141 via first objective lens 121 for DVD.

The incident beam is partially transmitted through first coating face 142 of first beam splitter 141, and then the beam is condensed by a condensing lens 161 to be received on photodetector 160, and thereby reproducing information on DVD, and controlling focusing and tracking.

Embodiment 2

Figure 4:
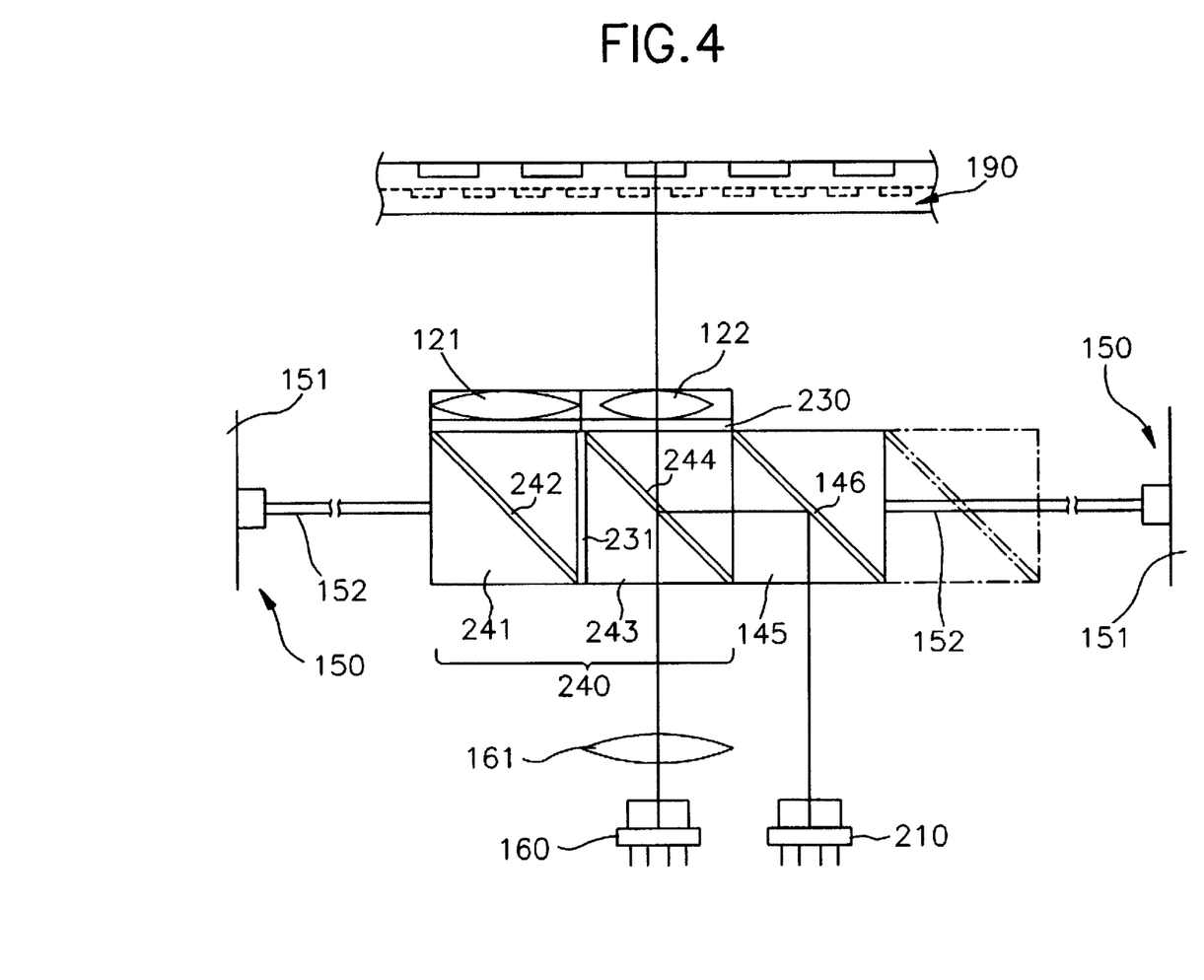
FIG. 4 is a schematic view showing an optical pickup device according to a second embodiment of the present invention.

FIG. 4 is a schematic view showing the optical pickup device according to a second embodiment of the present invention.

In this embodiment, as shown in FIG. 4, a laser diode 210 with wavelength 650 nm is installed as a light source that generates a laser beam, which can be reproduce both CD(Compact Disc) and DVD(Disital Video Disc) with different densities each other. Laser diode is disposed to irradiate laser beams that a ratio of a first polarization to a second polarization is 1:1.

Objective lens part 120 is positioned over the laser diode 210. Objective lens part 120 is the same as in Embodiment 1.

A polarization-converting plate 230 is installed under objective lens part 120. Polarization-converting plate 230 is λ/4 plate.

Beam splitter part 240 is integrally installed under polarization-converting plate 230. Beam splitter part 240 is composed of first and second beam splitter 241, 243 respectively arranged under first and second objective lenses 121, 122. The first and second beam splitters are cubic-shaped prisms of the same size. First and second polarizing faces 242, 244 of first and second beam splitters 241, 243 are respectively formed at diagonal faces of the beam splitters, the diagonal faces making an angle of 45° with optical axes of objective lens 121, 122. First and second polarizing faces 242, 244 are parallel with each other. First and second polarizing faces 242, 244 are polarizing faces which are totally reflecting a beam of P polarization and totally transmitting a beam of S polarization.

Between first and second beam splitters 241, 243 is installed a polarization-converting face 232 for converting a polarization state of the beam transmitted therethrough. Polarization-converting face 232 is λ/2 plate.

A third beam splitter 145 is formed integrally with and at a side of second beam splitter 243. Third beam splitter 145 is the same as in Embodiment 1.

Objective lens part 120, polarization-converting plate 230, beam splitter part 240, and third beam splitter 145 are integrally formed, of which both sides are contacted with actuating part 151 by wires 152. Thereby, they are actuated to be integrally moved in any direction for reproducing information and control focusing and tracking.

Similarly with Embodiment 1, photodetector 160 is installed at a predetermined position below beam splitter part 240. Photodetector 160 is installed in order to receive the beam transmitted through first beam splitter 241 via first objective lens 121 or the beam transmitted through second beam splitter 243 via second objective lens 122 after being reflected by optical disc 190.

Laser diode 210 and photodetector 160 are arranged side by side with the same interval as ones between the beam splitters 241, 243, 245, so that the optical disc with a predetermined density, the objective lens corresponding to the optical disc, the beam splitter connected under the objective lens, and the photodetector can be arranged on a straight line.

Hereinafter, an operation according to the foregoing embodiment will be described.

The laser beam that a ratio of P:S polarization is 1:1 is irradiated from laser diode 210 toward third beam splitter 145.

The beam is incident on third coating face 146 of beam splitter 160 with an angle of 45°. The laser beam is reflected by third coating face 146 to be bent at a rightangle with respect to the incident beam. Then, the beam is incident on second polarizing face 244 of beam splitter 243 with an angle of 45°. The beam of P polarization is reflected by second polarizing face 244 to be bent at a rightangle with respect to the incident beam and then proceeds to second objective lens 122 (objective lens for CD), and the beam of S polarization is transmitted through second polarizing face 244 to be incident on first polarizing face 242.

When the optical disc to be reproduced is CD, the beam transmitted through first objective lens for DVD 121 drops because the beam does not accurately focus on CD, only the beam transmitted through second objective lens for CD 122 can focus accurately on CD.

Thus, the beam focused on CD after being transmitted through second objective lens for CD 122 is reflected to be incident on second beam splitter 243 via second objective lens 122 for CD.

The beam is conversed into the beam of S polarization because the beam of P polarization goes and returns through polarization-converting plate 230 installed between second objective lens 122 and second beam splitter 243. The beam of S polarization is partially transmitted through second polarizing face 244 of second beam splitter 243, and then the beam is condensed by a condensing lens 161 to be received on photodetector 160, and thereby reproducing information on CD, controlling focusing and tracking are carried out.

When the optical disc to be reproduced is DVD, the beam transmitted through second objective lens for CD 122 drops because the beam does not accurately focus on DVD, only the beam transmitted through first objective lens for DVD 121 can focus accurately on DVD.

Thus, the beam focused on DVD after being transmitted through first objective lens for DVD 121 is reflected to be incident on first beam splitter 241 via first objective lens 121 for DVD. The incident beam is partially transmitted through first polarizing face 242 of first beam splitter 241, and then the beam is condensed by a condensing lens 161 to be received on photodetector 160, and thereby reproducing information on DVD, and controlling focusing and tracking.

Embodiment 3

Figure 5:
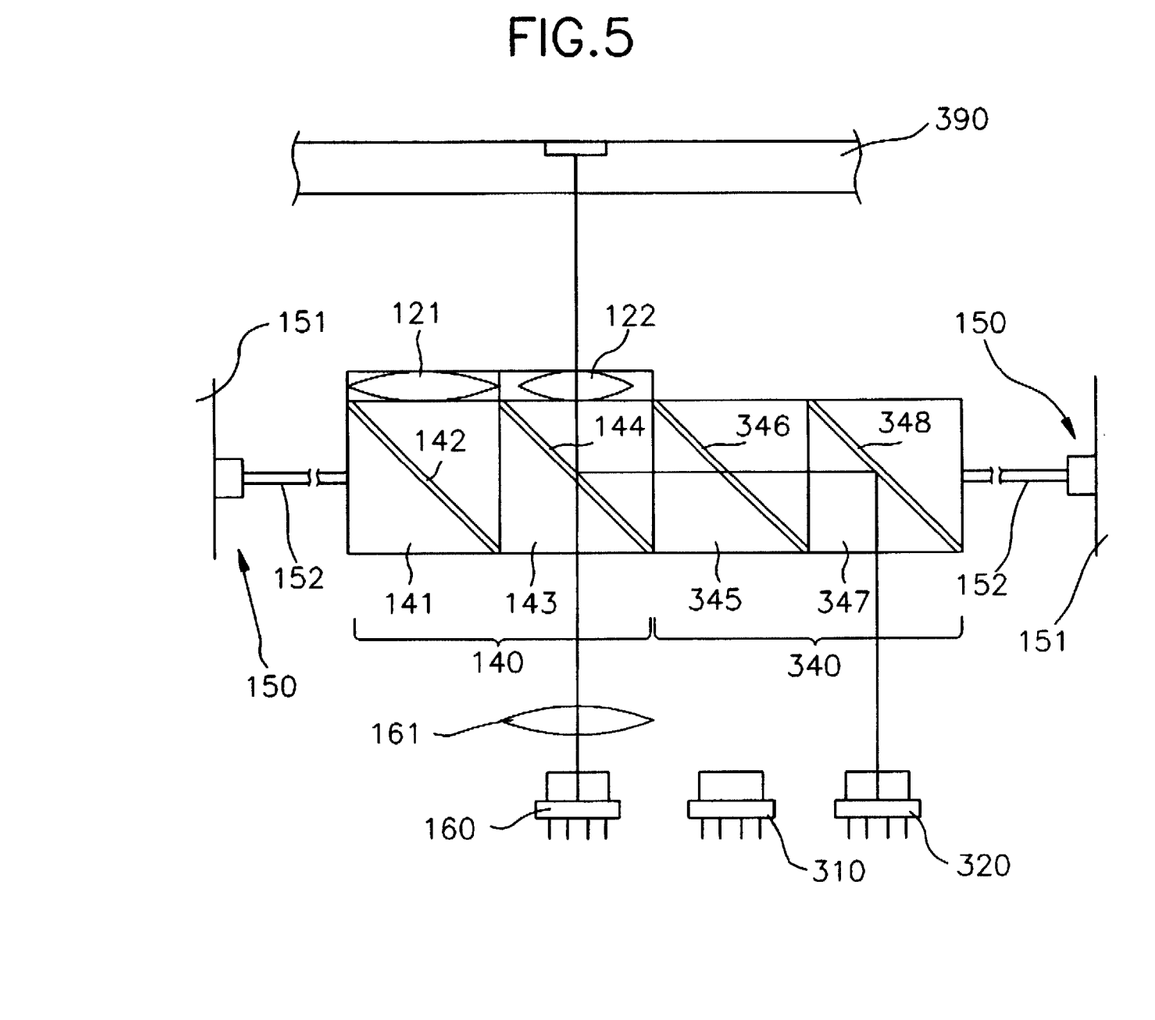
FIG. 5 is a schematic view showing an optical pickup device in which a beam path is shown when recording information onto an optical disc or reproducing information of the disc by a second laser light source according to a third embodiment of the present invention.

FIG. 5 is a schematic view showing an optical pickup device in which a beam path is shown when recording information to an optical disc or reproducing information of the disc by a second laser light source according to a third embodiment of the present invention In this embodiment, as shown in FIG. 5, as light sources, there are installed a first laser diode 310 with wavelength 650 nm which can reproduce both CD(Compact Disc) and DVD(Disital Video Disc) with different densities each other, and a second laser diode 320 with wavelength 780 nm which can record information on CDR (Compact Disc Recordable) and reproduce information of the CDR. First and second laser diodes 310, 320 are disposed from side to side of each other and parallel with the optical disc.

Objective lens part 120 is positioned over first and second laser diode 310, 320. Objective lens part 120 is the same as in Embodiment 1.

Beam splitter part 140 is integrally installed under objective lens part 120. Beam splitter part 140 is also the same as in Embodiment 1.

A reflecting part 340 is formed integrally with and at a side of second beam splitter 143. Reflecting part 340 is composed of third and fourth beam splitters 345, 347 integrally formed side by side each other. Third and fourth beam splitters 345, 347 are cubic-shaped prisms with an identical size as first and second beam splitters 141, 143. Third and fourth coating faces 346, 348 of third and fourth beam splitters 345, 347 are formed at diagonal faces of third and fourth beam splitters 345, 347, the diagonal face making an angle of 45° with optical axes of objective lens 121, 122. Third and fourth coating faces 346, 348 are parallel with first and second coating faces 142, 144. Fourth coating face 348 of fourth beam splitter 348 is preferably a totally reflecting face to minimize loss of the beam.

A wire type-actuator 150 is composed of wires 152 and an actuating part 151. Objective lens part 120, beam splitter part 140, and third beam splitter 145 are integrally formed, and both sides of the integral body are contacted with actuating part 151 by wires 152. Thereby, they are actuated to integrally move in any direction for reproducing information and control focusing and tracking.

A photodetector 160 is installed at a predetermined position below the beam splitter part. Photodetector 160 is installed in order to receive the beam transmitted through first beam splitter 141 via first objective lens 121 or the beam transmitted through second beam splitter 143 via second objective lens 122 after being reflected by optical disc 190.

First and second laser diodes 310, 320 and photodetector 160 are arranged side by side with the same interval as intervals between the beam splitters 141, 143, 345, 347, so that the optical disc with a predetermined density, the objective lens corresponding to the optical disc, the beam splitter connected under the objective lens, and the photodetector can be arranged on a straight line.

Hereinafter, an operation according to the foregoing embodiment will be described.

The operation by laser diode 310 with wavelength 650 nm is the same as in Embodiment 1.

In case of laser diode 320 with wavelength 780 nm, the beam is incident on fourth coating face 348 of fourth beam splitter 347 with an angle of 45°. The laser beam is reflected by fourth coating face 348 to be bent at a right angle with respect to the incident beam.

Then, the reflected beam is partially transmitted through third coating face 346 of third beam splitter 345 and then is incident on second coating face 144 of beam splitter 143 with an angle of 45°. One part of the beam is reflected by second coating face 144 to be bent at a rightangle with respect to the incident beam and then proceeds to second objective lens 122 (objective lens for CD), and the other part of the beam is transmitted through second coating face 144 to be incident on first coating face 142.

Since the optical disc to be recorded is CDR, the beam transmitted through first objective lens for DVD 121 drops because the beam does not accurately focus on CDR, only the beam transmitted through second objective lens for CD 122 can focus accurately on CDR, and thereby recording information on CDR is carried out.

Thus, the beam focused on CDR after being transmitted through second objective lens for CD 122 is reflected to be incident on second beam splitter 143 via second objective lens 122 for CD. The incident beam is partially transmitted through second coating face 144 of second beam splitter 143, and then the beam is condensed by a condensing lens 161 to be received on photodetector 160, and thereby controlling focusing and tracking.

Embodiment 4

Figure 6:
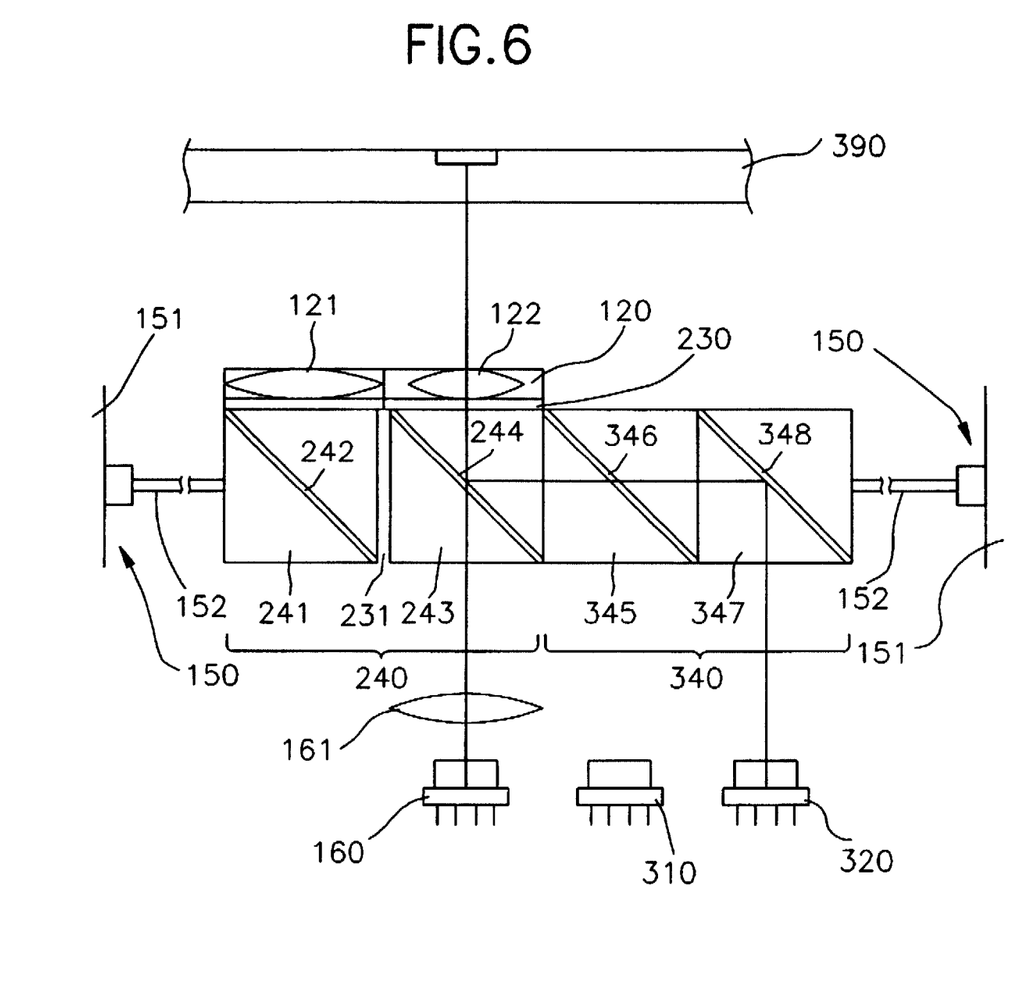
FIG. 6 is a schematic view showing an optical pickup device in which a beam path is shown when recording information onto an optical disc or reproducing information of the disc by a second laser light source according to a fourth embodiment of the present invention.

FIG. 6 is a schematic view showing an optical pickup device in which a beam path is shown when recording information onto an optical disc or reproducing information of the disc by a second laser light source according to a fourth embodiment of the present invention.

In this embodiment, as shown in FIG. 6, as light sources, there are installed a first laser diode 310 with wavelength 650 nm which can reproduce both CD(Compact Disc) and DVD(Disital Video Disc) with different densities each other, and a second laser diode 320 with wavelength 780 nm which can record information on CDR (Compact Disc Recordable) and reproduce information of the CDR. First and second laser diodes 310, 320 are disposed from side to side of each other and parallel with the optical disc.

Objective lens part 120 is positioned over first and second laser diodes 310, 320. Objective lens part 120 is the same as in Embodiment 1.

A polarization-converting plate 230 is installed under objective lens part 120. Polarization-converting plate 230 is λ/4 plate.

Beam splitter part 240 is integrally installed under polarization-converting plate 230. Beam splitter part 240 is composed of first and second beam splitter 241, 243 respectively arranged under first and second objective lenses 121, 122. The first and second beam splitters are cubic-shaped prisms of an identical size. First and second coating faces 242, 244 of first and second beam splitters 241, 243 are respectively formed at diagonal faces of the beam splitters, the diagonal faces making an angle of 45° with optical axes of objective lens 121, 122. First and second coating faces 242, 244 are parallel with each other. First and second coating faces 242, 244 are polarizing faces which are totally reflecting a beam of P polarization and totally transmitting a beam of S polarization.

Between first and second beam splitters 241, 243 a polarization-converting face 232 is installed for converting a polarization state of the beam transmitted therethrough. Polarization-converting face 232 is λ/2 plate.

Reflecting part 340 is formed integrally with and at a side of second beam splitter 243. Reflecting part 340 is composed of third and fourth beam splitters 345, 347 integrally formed side by side of each other. Third and fourth beam splitters 345, 347 are cubic-shaped prisms with an identical size as first and second beam splitters 241, 243. Third and fourth coating faces 346, 348 of third and fourth beam splitters 345, 347 are formed at diagonal faces of third and fourth beam splitters 345, 347, the diagonal face making an angle of 45° with optical axes of objective lens 121, 122. Third and fourth coating faces 346, 348 are parallel with first and second coating faces 242, 244. Fourth coating face 348 of fourth beam splitter 348 is preferably a totally reflecting face to minimize loss of the beam.

A wire type-actuator 150 is composed of wires 152 and an actuating part 151. Objective lens part 120, beam splitter part 140, and reflecting part 340 are integrally formed, both sides of the integral body are contacted with actuating part 151 by wires 152. Thereby, they are actuated to integrally move in any direction for reproducing information and control focusing and tracking.

A photodetector 160 is installed at a predetermined position below the beam splitter part. Photodetector 160 is installed in order to receive the beam transmitted through first beam splitter 241 via first objective lens 121 or the beam transmitted through second beam splitter 243 via second objective lens 122 after being reflected by optical disc 190.

First and second laser diodes 310, 320 and photodetector 160 are arranged side by side with the same interval as intervals between the beam splitters 241, 243, 345, 347, so that the optical disc with a predetermined density, the objective lens corresponding to the optical disc, the beam splitter connected under the objective lens, and the photodetector can be arranged on a straight line.

Hereinafter, an operation according to the foregoing embodiment will be described.

The operation by laser diode 310 with wavelength 650 nm is the same as in Embodiment 1.

In case of laser diode 320 with wavelength 780 nm, the beam is incident on fourth coating face 348 of fourth beam splitter 347 with an angle of 45°. The laser beam is reflected by fourth coating face 348 to be bent at a rightangle with respect to the incident beam.

Then, the reflected beam is partially transmitted through third coating face 346 of third beam splitter 345 and then is incident on second polarizing face 244 of beam splitter 243 with an angle of 45°. The beam of P polarization is reflected by second polarizing face 244 to be bent at a rightangle with respect to the incident beam and then proceeds to second objective lens 122 (objective lens for CD), and the beam of S polarization is transmitted through second polarizing face 244 to be incident on first polarizing face 242.

Since the optical disc to be recorded is CDR, the beam transmitted through first objective lens for DVD 121 drops because the beam does not accurately focus on CDR. only the beam transmitted through second objective lens for CD 122 can focus accurately on CDR, and thereby recording information on CDR is carried out.

Thus, the beam focused on CDR after being transmitted through polarization-conversing plate 230 and second objective lens for CD 122 is reflected to be incident on second beam splitter 243 via second objective lens 122 for CD and polarization-conversing plate 230. The beam conversed into S polarization is totally transmitted through second polarizing face 244 of second beam splitter 243, and then the beam is condensed by a condensing lens 161 to be received on photodetector 160, and thereby controlling the focusing and the tracking are carried out.

According to the optical pickup device of the present invention as described above, the objective lens part having two objective lenses for reproducing discs of two kinds with different densities is used, thereby making it possible to reproduce discs of two types with different densities by means of the single optical pickup device. Also, an objective lens part and a beam splitter part are integrally formed and actuated, so that the number of required constituent elements can be decreased and the operational mechanism of the objective lens part and the beam splitter part is simplified, and therefore, the error generation rate is sharply decreased when reproducing information of the optical disc.

Furthermore, by means of such a very simple construction in which a fourth beam splitter is connected to the beam splitter part and a second laser light source for irradiating a laser beam of another wavelength toward the fourth beam splitter is installed, recording information on CDR (Compact Disc Recordable) and reproducing information of the CDR which requires the laser beam of another wavelength is possible.

According to the optical pickup device of the present invention, in case of Compact Disc and Digital Video Disc of which recording capacities are different, it possible to reproduce both discs of the two types. Moreover, in case of CDR which requires the laser beam of another wavelength, it is also possible to record and reproduce the disc by only adding the simple constituent elements in manufacturing the optical pickup device.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An optical pickup device for reproducing optical discs of two kinds having different densities comprising:

a laser light source for irradiating a laser beam;

objective lens means for focusing the laser beam on optical discs of two kinds having different densities, the objective lens means being positioned on an optical path of the laser beam irradiated from the laser light source and having first and second objective lenses integrally disposed from side to side of each other and parallel with the optical disc;

beam splitter means having first and second beam splitter respectively arranged under the first and second objective lenses, the beam splitter means being integrally actuated with the objective lens means, the beam splitter means having first and second coating faces for respectively reflecting upwardly toward the first and second objective lens, the first and second coating faces being parallel with each other, the first and second coating faces being partially reflecting and partially transmitting faces so that one part of the incident beam onto the second coating face is reflected toward the second objective lens and the other part is transmitted toward the first coating face;

a third beam splitter formed integrally with the second beam splitter to integrally operate with the beam splitter means, the third beam splitter having a third coating face to reflect the beam from the laser light source toward the second coating face of the second beam splitter;

a wire type-actuator for integrally moving freely in any direction the objective lens means, the beam splitter means, and the third beam splitter by means of a wire in order to record information and control focusing and tracking; and photodetecting means for receiving a beam transmitted through the first or second beam splitter via the first or second objective lens after the beam is reflected by the optical disc, the photodetecting means being installed at a predetermined position below the beam splitter means.

2. An optical pickup device as claimed in claim 1, wherein the first, second, and third beam splitters are cubic-shaped prisms of an identical size, the first, second, and third coating faces being respectively formed at diagonal faces of the beam splitters, the diagonal face making an angle of 45° with an optical axis of the objective lens.

3. An optical pickup device as claimed in claim 2, wherein the laser light source and photodetector are arranged side by side with the same interval as intervals between the beam splitters, so that the optical disc with a predetermined density, the objective lens corresponding to the optical disc, the beam splitter connected under the objective lens, and the photodetector can be arranged on a straight line.

4. An optical pickup device as claimed in claim 1, wherein the third coating face of third beam splitter comprises a totally reflecting face to minimize loss of the beam.

5. An optical pickup device for reproducing optical discs of two kinds having different densities comprising:

a laser light source for irradiating laser beams with a predetermined ratio of a first polarization to a second polarization;

objective lens means for focusing the laser beam on optical discs of two kinds having different densities, the objective lens means being positioned on an optical path of the laser beams irradiated from the laser light source and having first and second objective lenses integrally disposed from side to side of each other and parallel with the optical disc;

beam splitter means having first and second beam splitters respectively arranged under the first and second objective lenses, the beam splitter means being integrally actuated with the objective lens means, the beam splitter means having first and second polarizing faces for reflecting an incident beam toward the first and second objective lenses or for transmitting the beams therethrough, the first and second polarizing faces being parallel with each other, a polarization-converting face being installed between the first and the second beam splitters for converting a polarization state of the beam transmitted therethrough, so that among the beams which are incident on the second polarizing face, a beam of first polarization is reflected toward the second objective lens, and the beam of second polarization is transmitted through the second polarizing face and then the polarization state of the beam is converted into first polarization by the polarization-converting face, and the converted beam of first polarization is reflected by the first polarizing face toward the first objective lens;

a polarization-converting plate installed between the objective lens means and the beam splitter means, so that, while the beam of first polarization reflected by the first or the second polarizing face of the beam splitter means is returned to the beam splitter means via the optical disc, a polarization of the beam is converted into the second polarization;

a third beam splitter formed integrally with the second beam splitter to integrally operate with the beam splitter means, the third beam splitter having a third coating face to reflect the beam from the laser light source toward the second polarizing face of the second beam splitter;

a wire type-actuator for integrally moving freely in any direction the objective lens means, the beam splitter means, and the third beam splitter by means of a wire in order to record information and control focusing and tracking; and photodetecting means for receiving a beam transmitted through the first or second beam splitter via the first or second objective lens after the beam is reflected by the optical disc, the photodetecting means being installed at a predetermined position below the beam splitter means.

6. An optical pickup device as claimed in claim 5, wherein a ratio of P:S polarization of the laser light source is 1:1.

7. An optical pickup device as claimed in claim 5, wherein the polarization-converting face installed between the first beam splitter and the second beam splitter comprises $\lambda/2$ plate.

8. An optical pickup device as claimed in claim 5, wherein the polarization-converting plate installed between the objective lens means and the beam splitter means comprises $\lambda/4$ plate.

9. An optical pickup device as claimed in claim 5, wherein the first, second, and third beam splitters are cubic-shaped prisms of an identical size, the first and second polarizing faces and the third coating face being respectively formed at diagonal faces of the beam splitters, the diagonal face making an angle of 45° with an optical axis of the objective lens.

10. An optical pickup device as claimed in claim 9, wherein the laser light source and photodetector are arranged side by side with the same interval as intervals between the beam splitters, so that the optical disc with a predetermined density, the objective lens corresponding to the optical disc, the beam splitter connected under the objective lens, and the photodetector can be arranged on a straight line.

11. An optical pickup device as claimed in claim 5, wherein the third coating face of third beam splitter comprises a totally reflecting face to minimize loss of the beam.

12. An optical pickup device for recording or reproducing optical discs of two kinds having different densities comprising:

first and second laser light sources for irradiating laser beams with different wavelengths;

objective lens means for focusing the laser beam on optical discs of two kinds having different densities, the objective lens means being positioned on an optical path of the laser beam irradiated from the laser light source and having first and second objective lenses integrally disposed from side to side of each other and parallel with the optical disc;

beam splitter means having first and second beam splitter respectively arranged under the first and second objective lenses, the beam splitter means being integrally actuated with the objective lens means, the beam splitter means having first and second coating faces for respectively reflecting upwardly toward the first and second objective lens, the first and second coating faces being parallel with each other, the first and second coating faces being partially reflecting and partially transmitting faces so that one part of the incident beam onto the second coating face is reflected toward the second objective lens and the other part is transmitted toward the first coating face;

reflecting means having third and fourth beam splitters formed integrally with the second beam splitter to integrally operate with the beam splitter means, the third and the fourth beam splitters having respective third and fourth coating faces to reflect the beam from the laser light source toward the second coating face of the second beam splitter, the third and the fourth coating faces being parallel with each other, the third and the fourth coating faces being partially reflecting and partially transmitting faces so that the beam irradiated from the first laser light source is reflected by the third coating face toward the second coating face of the second beam splitter and the beam irradiated from the second laser light source is reflected by the fourth coating face to be partially transmitted through the third coating face and then proceed toward the second coating face of the second beam splitter;

a wire type-actuator for integrally moving freely in any direction the objective lens means, the beam splitter means, and the reflecting means by means of wires in order to record information and control focusing and tracking; and photodetecting means for receiving a beam transmitted through the first or second beam splitter via the first or second objective lens after the beam is reflected by the optical disc, the photodetecting means being installed at a predetermined position below the beam splitter means.

13. An optical pickup device as claimed in claim 12, wherein the first, second, and third beam splitters are cubic-shaped prisms of an identical size, the first, second, and third coating faces being respectively formed at diagonal faces of the beam splitters, the diagonal face making an angle of 45° with an optical axis of the objective lens.

14. An optical pickup device as claimed in claim 12, wherein the laser light source and photodetector are arranged side by side with the same interval as intervals between the beam splitters, so that the optical disc with a predetermined density, the objective lens corresponding to the optical disc, the beam splitter connected under the objective lens, and the photodetector can be arranged on a straight line.

15. An optical pickup device as claimed in claim 12, wherein the third coating face of third beam splitter comprises a totally reflecting face to minimize loss of the beam.

16. An optical pickup device for recording and reproducing optical discs of two kinds having different densities comprising:

first and second laser light sources for irradiating laser beams with different wavelengths, the laser light source for irradiating laser beams with a predetermined ratio of a first polarization to a second polarization;

objective lens means for focusing the laser beam on optical discs of two kinds having different densities, the objective lens means being positioned on an optical path of the laser beams irradiated from the laser light source and having first and second objective lenses integrally disposed from side to side of each other and parallel with the optical disc;

beam splitter means having first and second beam splitter respectively arranged under the first and second objective lenses and the beam splitter means being integrally actuated with the objective lens means, the beam splitter means having first and second polarizing faces for reflecting an incident beam toward the first and second objective lens or for transmitting the beams therethrough, the first and second polarizing faces being parallel with each other, a polarization-converting face being installed between the first and the second beam splitters for converting a polarization state of the beam transmitted therethrough, so that among the beams which are incident on the second polarizing face, a beam of first polarization is reflected toward the second objective lens, and the beam of second polarization is transmitted through the second polarizing face and then the polarization state of the beam is converted into first polarization by the polarization-converting face, and the converted beam of first polarization is reflected by the first polarizing face toward the first objective lens;

a polarization-converting plate installed between the objective lens means and the beam splitter means, so that, while the beam of first polarization reflected by the first or the second polarizing face of the beam splitter means is returned to the beam splitter means via the optical disc, a polarization of the beam is converted into the second polarization;

reflecting means having third and fourth beam splitters formed integrally with the second beam splitter to integrally operate with the beam splitter means, the third and the fourth beam splitters having respective third and fourth coating faces to reflect the beam from the laser light source toward the second polarizing face of the second beam splitter, the third and the fourth coating faces being parallel with each other, the third and the fourth coating faces being partially reflecting and partially transmitting faces so that the beam irradiated from the first laser light source is reflected by the third coating face toward the second polarizing face of the second beam splitter and the beam irradiated from the second laser light source is reflected by the fourth coating face to be partially transmitted through the third coating face and then proceed toward the second polarizing face of the second beam splitter;

a wire type-actuator for integrally moving freely in any direction the objective lens part, the beam splitter means, and the third beam splitter by means of a wire in order to record information and control focusing and tracking;

photodetecting means for receiving a beam transmitted through the first or second beam splitter via the first or second objective lens after the beam is reflected by the optical disc, the photodetecting means being installed at a predetermined position below the beam splitter means.

17. An optical pickup device as claimed in claim 16, wherein a ratio of P:S polarization of the laser light source is 1:1.

18. An optical pickup device as claimed in claim 16, wherein the polarization-converting face installed between the first beam splitter and the second beam splitter comprises $\lambda/2$ plate.

19. An optical pickup device as claimed in claim 16, wherein the polarization-converting plate installed between the objective lens means and the beam splitter means comprises $\lambda/4$ plate.

20. An optical pickup device as claimed in claim 16, wherein the first, second, and third beam splitters are cubic-shaped prisms of an identical size, the first and second polarizing faces and the third coating face being respectively formed at diagonal faces of the beam splitters, the diagonal face making an angle of 45° with an optical axis of the objective lens.

* * * * *